US011348159B1

(12) United States Patent
Vadaparty et al.

(10) Patent No.: US 11,348,159 B1
(45) Date of Patent: *May 31, 2022

(54) METADATA DRIVEN ORCHESTRATION ENGINE

(71) Applicant: Morgan Stanley Services Group Inc., New York, NY (US)

(72) Inventors: Kumar Vadaparty, New York, NY (US); Vishal Agrawal, New York, NY (US); Arun Maroli, New York, NY (US); Martin Leduc, Montreal (CA)

(73) Assignee: Morgan Stanley Services Group Inc., New York, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/095,378

(22) Filed: Nov. 11, 2020

Related U.S. Application Data (63) Continuation of application No. 16/531,241, filed on Aug. 5, 2019, now Pat. No. 10,867,343.

(60) Provisional application No. 62/724,918, filed on Aug. 30, 2018.

(51) Int. Cl.
| | |
|---|---|
| *G06F 9/44* | (2018.01) |
| *G06Q 30/06* | (2012.01) |
| *G06N 5/02* | (2006.01) |
| *G06Q 20/12* | (2012.01) |
| *G06F 8/41* | (2018.01) |

(52) U.S. Cl.
CPC .......... *G06Q 30/0635* (2013.01); *G06F 8/41* (2013.01); *G06N 5/025* (2013.01); *G06Q 20/123* (2013.01)

(58) Field of Classification Search
None
See application file for complete search history.

(56) References Cited

U.S. PATENT DOCUMENTS

| | | | |
|---|---|---|---|
| 7,130,891 B2 | 10/2006 | Bernardin et al. | |
| 8,117,589 B2 | 2/2012 | Christensen et al. | |
| 8,484,664 B2 | 7/2013 | Marvin et al. | |
| 8,631,386 B2 | 1/2014 | Doshi | |
| 8,943,482 B2 | 1/2015 | Andrade et al. | |
| 9,043,765 B2 | 5/2015 | Ahmed et al. | |
| 9,110,681 B2 | 8/2015 | Branson et al. | |
| 9,129,040 B2 | 9/2015 | Branson et al. | |
| 9,299,105 B2 | 3/2016 | Martignoni | |
| 9,396,037 B2 | 7/2016 | Morsi et al. | |
| 9,658,901 B2 | 5/2017 | Addala et al. | |
| 9,672,560 B2 | 6/2017 | Malapati et al. | |
| 9,880,819 B2 | 1/2018 | Beretta et al. | |
| 9,959,100 B2 | 5/2018 | Straub | |

(Continued)

*Primary Examiner* — Insun Kang
(74) *Attorney, Agent, or Firm* — K&L Gates LLP (57) ABSTRACT

An efficient reusable, extensible light weight framework statelessly orchestrates system activities in any application which involves a series of sequential or parallel set of activities involving computational logic, data retrieval and persistence services. Actual orchestration steps and activities and computational logic are specified into configuration files, separate from the orchestration engine itself, thereby eliminating the need to code for such logic and activities. The framework can eliminate the need to code business logic and orchestration of data retrieval services by externalizing them into configuration files, resulting in lower costs to implement, test and maintain such system during its lifespan.

20 Claims, 5 Drawing Sheets

(56) References Cited

U.S. PATENT DOCUMENTS

| | | |
|---|---|---|
| 10,581,675 B1 | 3/2020 | Iyer |
| 10,642,583 B2 | 5/2020 | Cook et al. |
| 2008/0028371 A1 | 1/2008 | Brothers et al. |
| 2008/0177872 A1 | 7/2008 | Vengroff |
| 2009/0089202 A1 | 4/2009 | Rowley |
| 2012/0159423 A1 | 6/2012 | Becker et al. |
| 2014/0059513 A1 | 2/2014 | Sabo |
| 2017/0109210 A1 | 4/2017 | Goossens |
| 2018/0253340 A1 | 9/2018 | Barsness et al. |
| 2018/0373515 A1* | 12/2018 | Brown .................. G06F 8/4434 |
| 2019/0310899 A1* | 10/2019 | Oravivattanakul ..... G06F 9/544 |
| 2020/0004849 A1 | 1/2020 | Baker et al. |
| 2020/0026711 A1 | 1/2020 | Blom et al. |

* cited by examiner fig. 1

Fig. 2

| Step | Activity Type | ActivityID | Expression | Outcome | Dependency |
|---|---|---|---|---|---|
| 1 | Rule | ID1 | OrderAmount>Dealsize | Block | None |
| 1 | Rule | ID2 | TradeDate <> Date.Today | Block | None |
| 2 | DataService | DS1 | LookupAccount | Block | None |
| 3 | Rule | ID3 | AccountStatus=closed | Block | DS1 |
| 3 | Rule | ID4 | AccountTradingStatus=False | Block | DS1 |
| 4 | DataService | DS2 | LookupFAData | Block | None |
| 5 | Rule | ID5 | FATrainingFlag=False | Review | DS2 |

```
<at:ruleExpression at:activityID="LargeOrder" at:lang="MVEL" at:row="25">order.amount > $firm_options.large
<at:ruleExpression at:activityID="OrderTooSmall" at:lang="MVEL" at:row="26">order.amount </at:ruleExpression>
<at:ruleExpression at:activityID="OrderTooLarge" at:lang="MVEL" at:row="27">order.amount > deal.order_options
<at:ruleExpression at:activityID="AccountNotEligible" at:lang="MVEL" at:row="20">account.eligibility_level </at:
```

*fig. 3A*

```
<at:activityTable at:workmass="Order-AT">
  <at:key at:channel="PA/Sales Assistant, Desk" at:mode="NEW" at:operation="validateOrder" at:product="Primary Mania"
    at:endpoint="TPMMO"/>
  <at:dataServiceEndpoint at:activityid="DirectoryDS" at:row="01">xacfidFromOrder</at:dataServiceEndpoint>
  <at:dataServiceEndpoint at:activityid="ActDS" at:row="22">lookipAccount</at:dataServiceEndpoint>
  <at:dataServiceEndpoint at:activityid="FADS" at:row="23">lookipFinancialAdvisor</at:dataServiceEndpoint>
  <at:dataServiceEndpoint at:activityid="EFRDS" at:row="24">lookipFinancialAdvisorEntitlements</at:dataServiceEndpoint>
  <at:dataServiceEndpoint at:activityid="validative" at:row="92">validateAccount</at:dataServiceEndpoint>
</at:activityTable>
```

*fig. 3B* fig. 3C

METADATA DRIVEN ORCHESTRATION ENGINE

PRIORITY CLAIM

The present application is a continuation application under 35 U.S.C. § 120 of U.S. application Ser. No. 16/531, 241, filed Aug. 5, 2019, which claims priority to U.S. provisional patent application Ser. No. 62/724,918, with the same name and inventors as above, both of which are incorporated herein by reference in their entirety.

CROSS-REFERENCE TO RELATED APPLICATIONS

U.S. application Ser. No. 16/690,596, filed Nov. 21, 2019, now U.S. Pat. No. 10,769,714, issued Sep. 8, 2020, is also a continuation of U.S. application Ser. No. 16/531,241.

BACKGROUND

In the field of computer networks, "middle tier" refers to the processing that takes place in an application server that sits between a user's machine and a database server. A middle tier server typically performs business logic. For example, an order management middle-tier system, which services an order entry application for a trade order involving financial products (e.g., stocks, bonds, etc.), is typically implemented using a code based approach involving orchestration of various activities, such as business logic execution and data retrieval services. This code based approach results in an increased effort to implement, test and maintain the system during its lifespan.

SUMMARY

In one general aspect, the present invention is directed to an efficient reusable, extensible light weight framework for stateless orchestration of system activities that can be used in any application which involves a series of sequential or parallel set of activities involving computational logic, data retrieval and persistence services. Actual orchestration steps and activities and computational logic are specified into configuration files, separate from the orchestration engine itself, thereby eliminating the need to code for such logic and activities.

In one general aspect, the preset invention provides a generic approach to implementing a typical middle-tier supporting an order management system. By taking a configuration file approach, the need to code the business logic is eliminated, as is the orchestration of various system activities such as data retrieval services. By implementing such generic approach, it provides an easy to use framework for performing stateless orchestration of such activities, specifying cross dependencies, generating automatic system logs, supporting asynchronous and synchronous manners of execution.

In particular, in one general aspect, the present invention is directed to an order management system and a method for configuring a computer-implemented order management system. The order management system comprises a middle tier and a computer-implemented artifact translation system. The middle tier comprises one or more server that execute an orchestration engine that orchestrates calls to one or more back-end systems for implementing trade orders for financial products. The computer-based artifact translation system is configured, through programming, to: (i) receive a configuration file that specifies a sequence of activities to be performed by the orchestration engine; and (ii) generate, at compile time, metadata code artifacts from the configuration file, where the metadata code artifacts capture the sequence of activities to be performed by the orchestration engine, and where the orchestration engine uses the metadata code artifacts at runtime to manage the calls to the back-end systems. The method comprises: (i) receiving, by the computer-based artifact translation system, a configuration file that specifies the sequence of activities to be performed by the orchestration engine; (ii) generating, at compile time, by the computer-based artifact translation system, the metadata code artifacts from the configuration file; and (iii) using, at run time, by the orchestration engine of the middle tier, the metadata code artifacts to orchestrate calls to one or more back-end systems of the order management system for implementing trade orders for financial products.

The framework can eliminate the need to code business logic and orchestration of data retrieval services by externalizing them into configuration files, resulting in lower costs to implement, test and maintain such system during its lifespan. These and other benefits of the present invention will be apparent from the description that follows.

FIGURES

Various embodiments of the present invention are described herein by way of example in connection with the following figures, wherein.

DESCRIPTION

Figure 1:
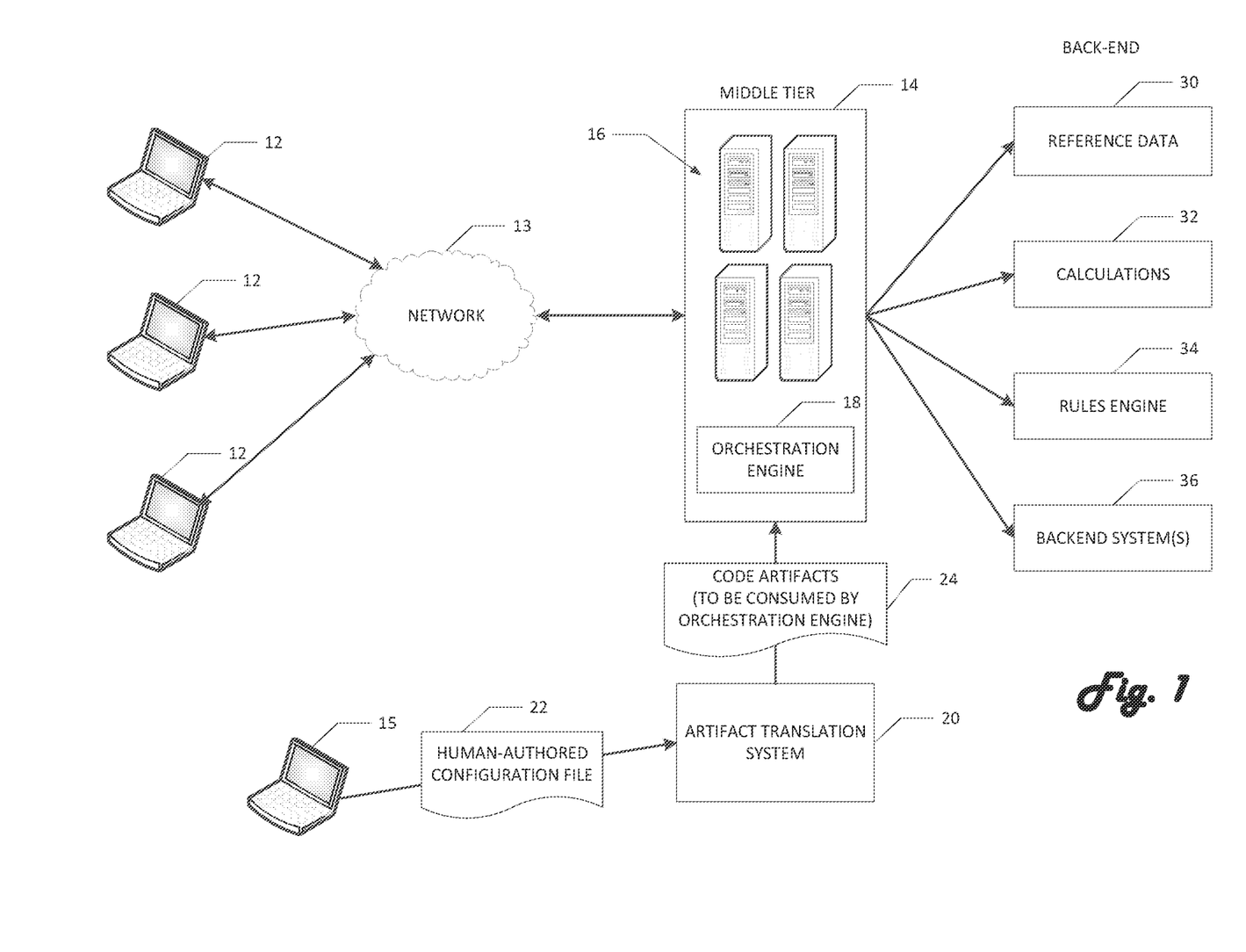
FIG. 1 is a middle tier system according to various embodiments of the present invention.

FIG. 1 illustrates aspects of a conventional middle tier architecture. Users, at computer devices 12, submit requests to a middle tier 14 via a data network 13. The data network 13 may be the Internet, a LAN, a WAN, etc. The middle tier 14 may be implemented with servers 16, which may include and execute an orchestration engine 18 that processes the user requests. In particular, the orchestration engine 18 may be a software program executed by the servers 16 that, when executed, orchestrates calls to back-end systems to obtain data and execute the necessary business logic to respond to the user requests. General aspects of the present invention are described herein in the context of a middle tier order management system that handles trade orders for financial products. Users at computer devices 12 may place trade orders for financial products and the middle tier orchestration engine 18 orchestrates the required back-end calls to implement the trade orders. In such a context, the back-end systems may comprise a reference data system(s) 30, a calculation engine(s) 32, a rules engine(s) 34 and other back-end systems 36 that are required to implement a trade order. The back-end systems 30-36 may be implemented with suitable computer systems, such as database management systems, servers, mainframes, etc.

Conventionally, the code for the middle tier orchestration engine 18 is typically written in Java, .Net, Scala or the like. Frameworks and/or code libraries are often used for the orchestration engine 18, but the result is typically a purpose-built application, which is time-consuming and difficult to implement, test and maintain during its lifespan.

In contrast to the conventional code-based approach, as shown in FIG. 1, the present invention utilizes a computer-based, artifact translation system 20 that converts a sequence of activities defined in a configuration file 22 into code artifacts 24 for the orchestration engine 18 to use at compile time. The code artifacts 24 include meta-data representations of the steps to be performed by, and corresponding conditions to be evaluated by, the orchestration engine 18 at runtime to orchestrate the back-end calls, etc.

Figure 2:
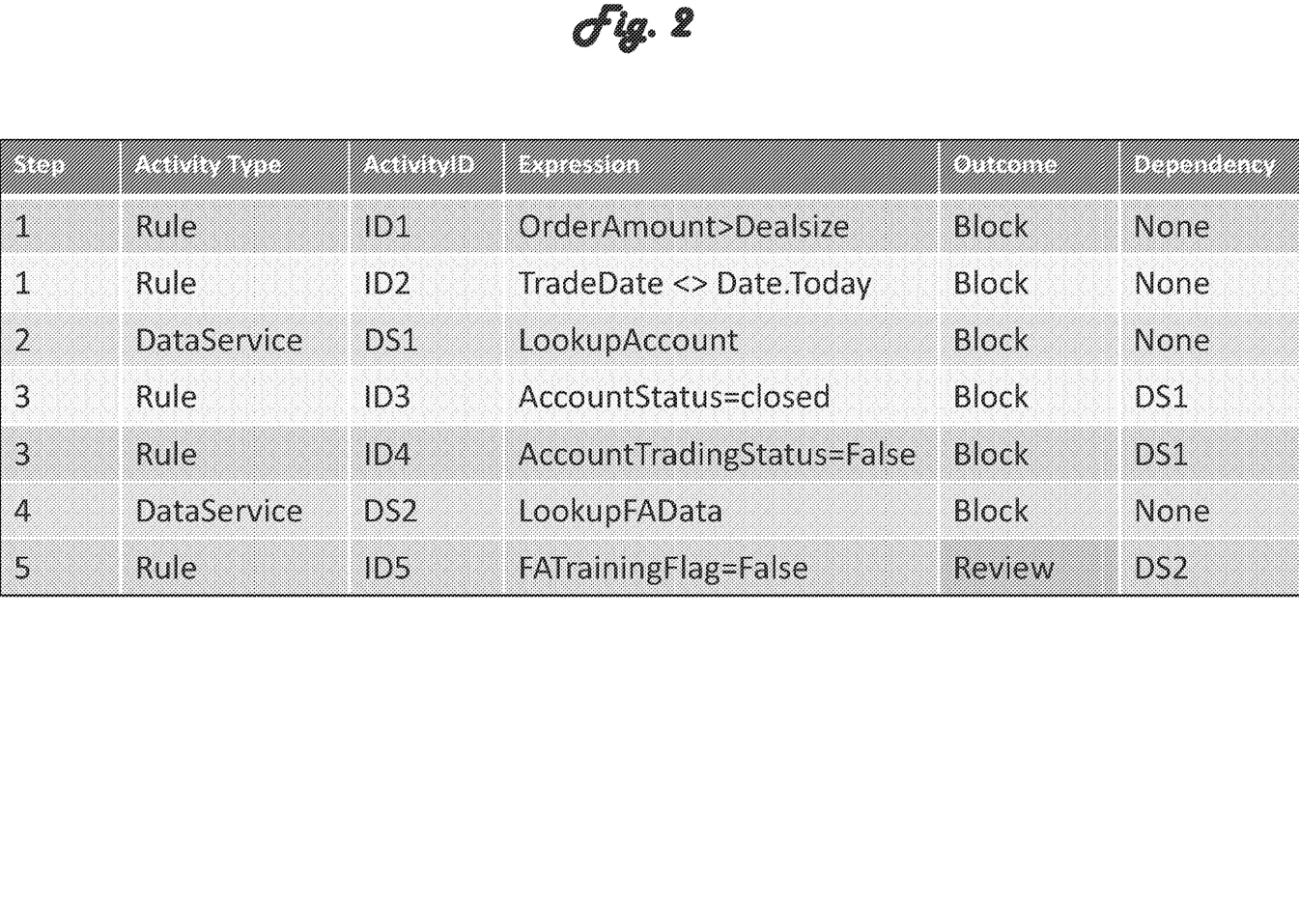
FIG. 2 depicts an example of an activity table for specifying activities for the orchestration engine of the middle tier system of FIG. 1 according to various embodiments of the present invention.

In operation, according to various embodiments, a "programmer" at a computer device 15 may specify the required activities in a configuration file 22, which may include an activity table specified in a spreadsheet, although other suitable file types could be used to specify the activities. FIG. 2 shows an example activity table that could be included in a configuration file 22. Seven different activities are specified in the example of FIG. 2, denoted as follows in the "ActivityID" column: ID1, ID2, DS1, ID3, ID4, DS2 and ID5. In this example, the "ID" activities correspond to calls to the rules engine 34 in FIG. 1 and the "DS" activities correspond to calls to a data system 30, as indicated in the "Activity Type" column of FIG. 2. A summary of each activity is also provided in the "Expression" column. In this example, activity ID1 involves a back-end rule call to determine whether the order amount is greater than the deal size, in which case, if true, the result is that the trade order is blocked in this example, as shown in the "Outcome" column of FIG. 2. In this example, Activity ID2 involves a back-end rule call to determine whether the trade date does not equal the current date, in which case, if true, the trade order is also blocked; etc. The "Expressions" for the data service calls (DS1 and DS2) correspondingly indicate the data to be looked-up. For example, for DS1 the customer's account is looked-up, whereas in DS2 the data about the customer's financial agent (FA) is looked-up. Other activities and their corresponding outcome could be written in a similar manner by the programmer.

The outcome set forth in the outcome column of the activity table sets forth what the orchestration engine 18 is to do when the corresponding activity expression in the expression column is satisfied. To that end, the expressions may be set forth in simple Boolean logic expressions and the orchestration is to perform the corresponding "outcome" when the Boolean expression is true. Expressing activities in such a manner is far simpler and easier to understand than expressing the activities in programming languages like Scala, for example. Further, when expressed in this form, the artifact translation system 20 can parse the expression and corresponding outcome to extract what the orchestration engine is to evaluate at run time when orchestrating the back-end calls.

The programmer can also specify the order in which the activities are to be performed, such as in the "Step" column shown in FIG. 2, and the dependency of the activities in the "Dependency" column. In various embodiments, if the dependency for an activity failed, then the activity is not performed. The code artifacts 24 capture the sequencing such that steps denoted with the same number are executed in parallel and steps with different numbers are executed serially according to the specified order. In this example, the programmer specified that rule calls ID1 and ID2 should be performed in parallel because they both are performed at step 1, and that they do not depend on any other activities because their dependency is "none." Also, rule calls ID3 and ID4 are executed in parallel because they both are performed at step 3, and both depend on data service call DS1. That way, in operation, rule calls ID3 and ID4 could be skipped if the data service call DS1 fails at step 1, etc. Further, rule calls ID3 and ID4 are performed after data service call DS1 (assuming it does not fail), which is in turn performed after rule calls ID1 and ID2. Also, although not shown in the example of FIG. 2, the activity table may also specify, in another column, unique error codes returned to the caller for when the activity produces an error. Further, although not shown in the example of FIG. 2, the activity table may further specify the data model to be used for the back-end calls. In addition, in operation, the framework of the middle tier can automatically log, in a database or file or other suitable data storage, relevant information about the activity being executed, including the input and output payload details, for example.

In addition, in other embodiments, the activity table may comprise a "precondition" column that specify a precondition for certain activities that must be true in order for the corresponding activity to be performed. The precondition may be written with Boolean expressions that, when converted to the code artifacts by the artifact translation system, the orchestration engine 18 evaluates to determine whether the activity corresponding to the precondition should be performed (e.g., the corresponding activity is performed if the precondition Boolean expression is true). A precondition might be to check a certain data field in a certain database to see if the value in the data field is a particular value or in a particular range, for example. Some activities could have both a dependency and a precondition.

Figure 3A:
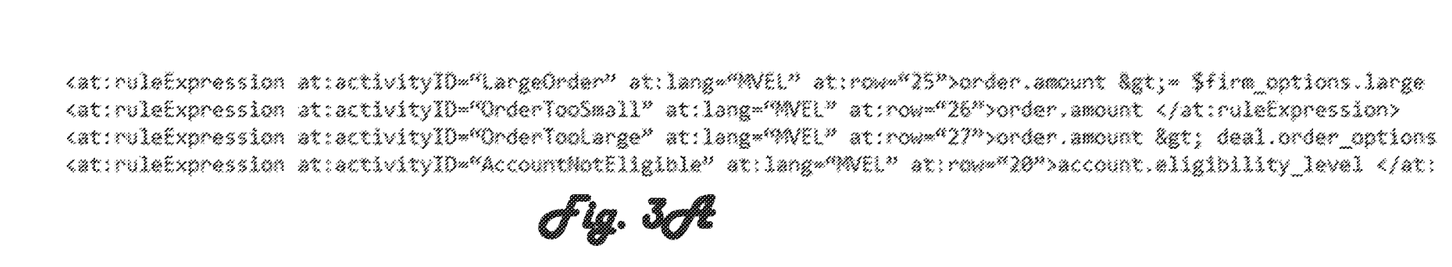
FIGS. 3A-C show sample code artifacts according to various embodiments of the present invention.
Figure 3B:
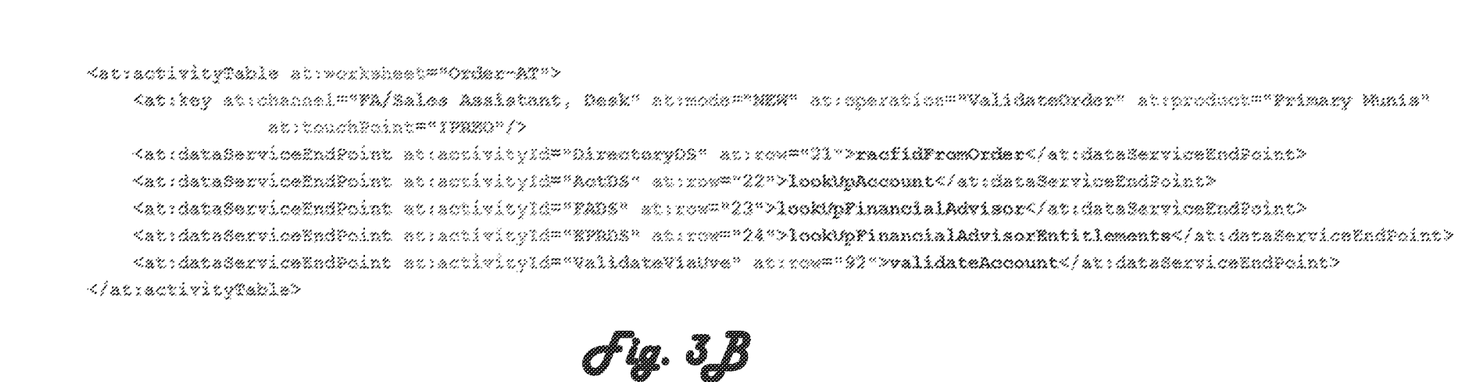
Figure 3C:
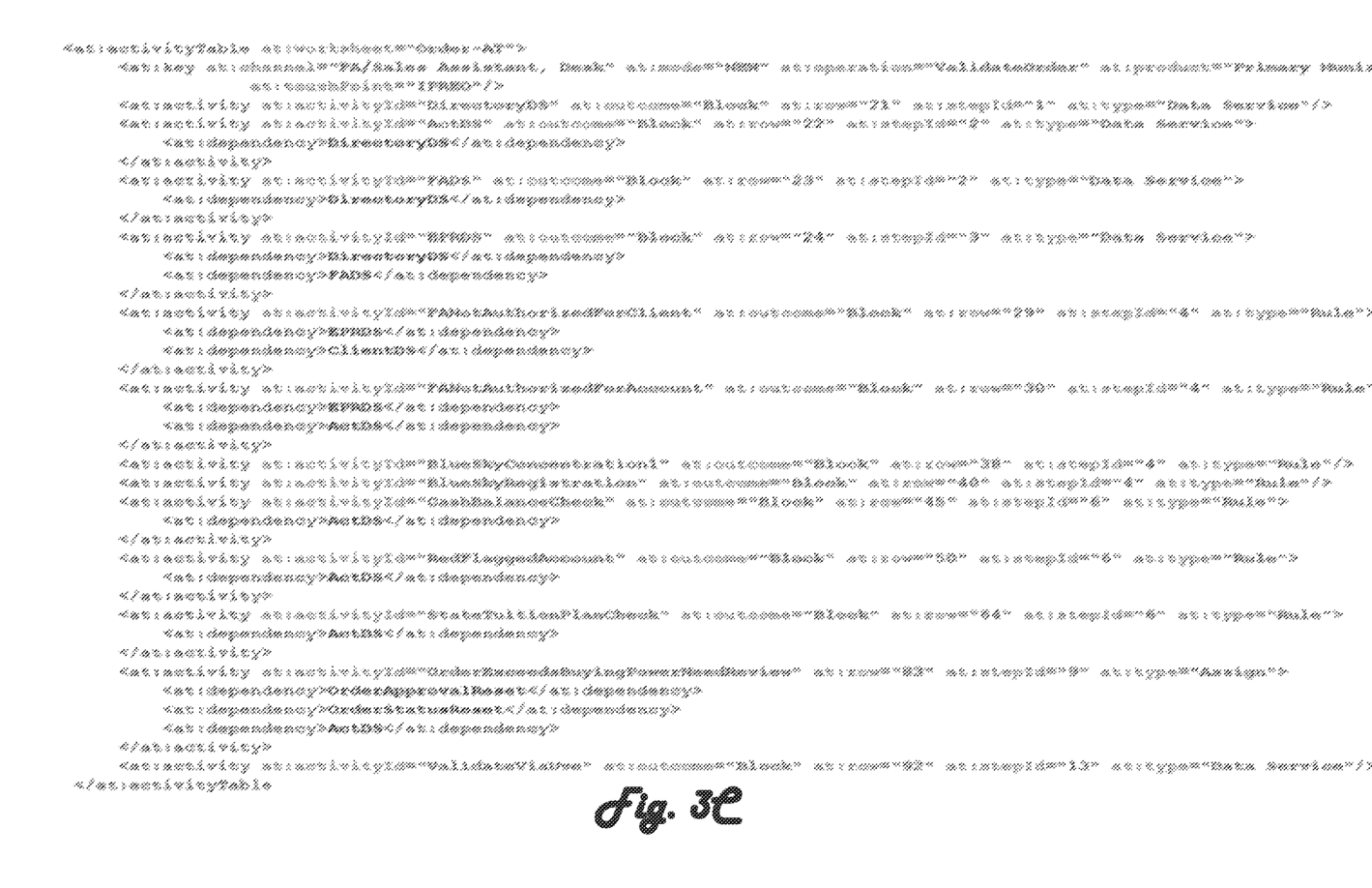

Assuming the code for the engine 18 is already written and operational, the approach described above reduces the need for coding the activities for a new product or process as the "programmer" can simply specify the activities for the new product or process in the activity table, which is converted to code 24 by the artifact translation system 20 to be used by the engine 18. In various embodiments, the configuration file 22 is stored in a memory of the artifact translation system 20 (e.g., uploaded from the programmer computer device 15) and the artifact translation system 20 converts the configuration file at compile to meta-data code artifacts to be stored in memory of the middle tier servers 16 and used by the middle tier engine 18 at runtime. Accordingly, the code artifacts 24 should be in a format suitable for use by the orchestration engine 18. In various embodiments, the orchestration engine 18 uses Java and/or Apache Camel, and the code artifacts 24 may be written in XML, or JSON, for example. FIGS. 3A-C show some example XML code artifacts generated by the artifact translation system 20. FIG. 3A shows XML code artifacts for various rule calls related to order size that appeared at rows 25 through 27 of an activity table. FIG. 3B shows XML code artifacts for data service calls that correspond to rows 21-24 and 92 of an activity table. And FIG. 3C shows XML code artifacts for various runtime sequencing, outcomes and dependencies. Note that in the example of FIG. 3C, the row numbers in the activity table correspond to activity IDs. For example, row 21 in the activity table corresponds to activity ID "DirectoryDS" and row 22 corresponds to activity ID "ActDS," etc. Also note that in the example of FIG. 3C, activity IDs "ActDS" and "FADS," which appear at rows 21 and 22 of the activity table respectively, both have "stepID=2," which shows that they would be executed synchronously, and after activity "DirectoryDS," which appears at row 21 of the activity table and has stepID=1. The code further indicates the activity type (e.g., "Rule" or "Data Service") for the activity IDs. Still further, the example code of FIG. 3C includes the rule dependencies from the activity table. For example, activity ID "FADS" is dependent upon activity ID "DirectoryDS." As another example, activity ID "EPRDS" depends from both DirectoryDS and FADS, and so on. As such, as shown in the examples of FIGS. 3A-C, the metadata artifacts 24 capture the rules, dependencies, timing, data models, etc. specified in the activity table.

Figure 4:
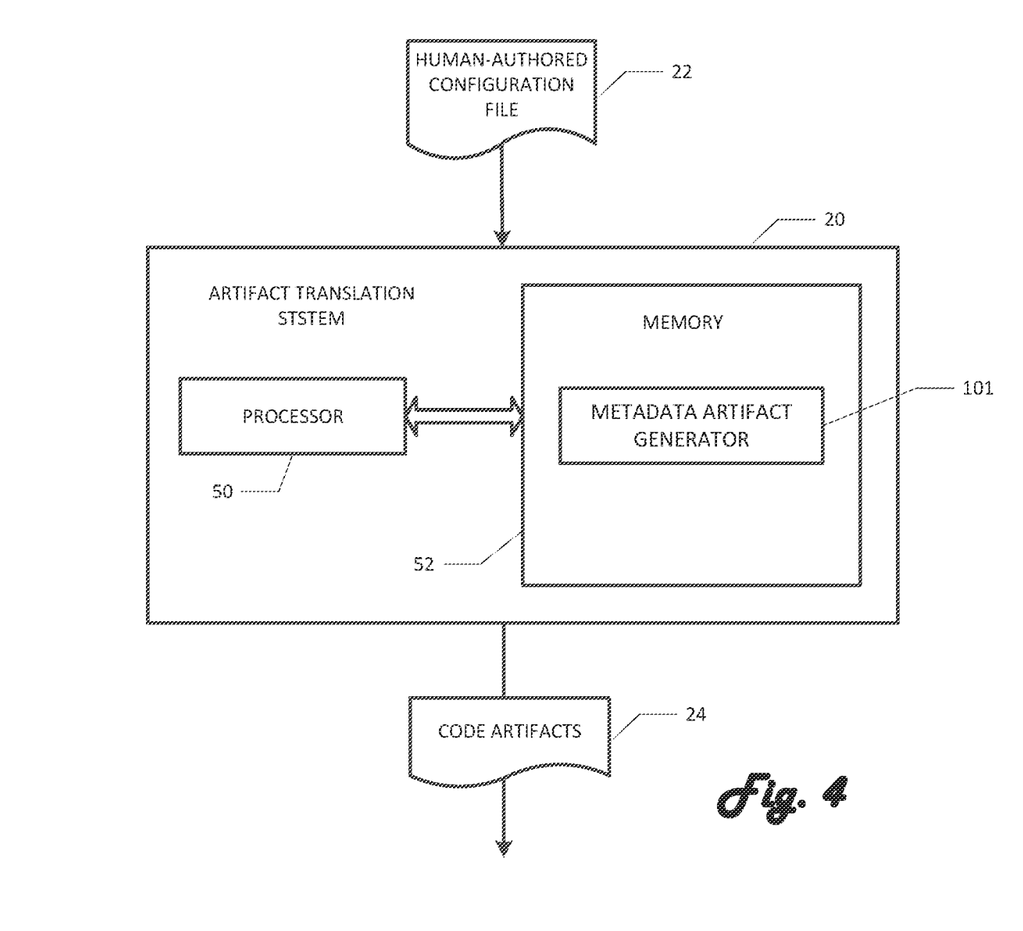
FIG. 4 is a diagram of the artifact translation system of FIG. 1 according to various embodiments of the present invention.

FIG. 4 is a diagram of the artifact translation system 20 according to various embodiments. As shown in FIG. 4, the artifact translation system 20 may be implemented with one or more computer systems that comprise one or more processors 50 and associate memory 52. The memory 52, as shown in FIG. 4, may comprise a artifact generator module 101 that comprises software code that, when executed by the processor 50, causes the processor to convert the configuration file 22 into the metadata-driven code artifacts 24 in XML or JSON, for example. In various embodiments, the artifact generator module 101 uses a program written in the Python or Java programming language to perform the conversion, although any other suitable programming language could be used. That is, for example, the artifact translation system 20 may be implemented by a computer device, such as a server (such as middle tier server) with one or more processor cores 50 and computer memory 52 (e.g., RAM and/or ROM). The memory 52 may store the programming instructions, e.g., the artifact generator module 101, written in the Python or Java programming language, for example, which programs or configures the processor cores of the artifact translation system 20 to receive the configuration file 22 and convert the activity table therein to the code artifacts 24 at compile time.

As may be apparent from the above description, embodiments of the present invention, in a general aspect, provide the ability: to perform stateless orchestration of activities; to specify a list of activities in configuration files 22, separate from the main engine 18; to perform activities in both synchronous and asynchronous manner of invocation (such as by specifying the steps for the activities in the activity file); to specify the list of activities in an easy to understand, human readable format and automatically convert that human readable format at compile time into machine readable version to be used at runtime; to specify cross dependencies across activities wherein if a parent activity fails, the child activity is not executed; to specify user-defined outcomes in an event that an activity encounters a system failure of any kind; to specify pre-conditions for activities in an easy to read logic expression to allow conditional invocation of such activities (e.g., the dependencies column in the activity table); specify user defined list of error messages to be returned to the caller in an event of failure of any activity; to automatically convert a human readable configuration file into a machine readable format to be used at runtime; to automatically generate system logs without adversely impacting the mainstream transaction; and to specify the data model to be used during the orchestration of activities.

Benefits that are realizable with embodiments of the present invention include: reducing of the cost to implement new systems; faster time-to-market for developing new systems; reducing the cost to test new systems; helping to streamline system log generation; externalizing business logic and orchestration instructions and sequence of system activities into human readable configuration files separate from the main code base to thereby help reduce the cost to maintain the system over its lifespan; and reducing the cost and skill experience of the resources required to implement an order management middle tier supporting an order entry application. Indeed, preliminary results show a ten times reduction in the amount of code that needs to be written for a middle tier order management system.

In one general aspect, therefore, the preset invention provides a generic approach to implementing a typical middle-tier supporting an order management system. By taking a configuration file approach, the need to code the business logic is eliminated, as is the orchestration of various system activities such as data retrieval services. By implementing such generic approach, it provides an easy to use framework for performing stateless orchestration of such activities, specifying cross dependencies, generating automatic system logs, supporting asynchronous and synchronous manners of execution.

In particular, in one general aspect, the present invention is directed to an order management system and a method for configuring a computer-implemented order management system. The order management system comprises a middle tier and a computer-implemented artifact translation system. The middle tier comprises one or more server that execute an orchestration engine that orchestrates calls to one or more back-end systems for implementing trade orders for financial products. The computer-based artifact translation system is configured, through programming, to: (i) receive a configuration file that specifies a sequence of activities to be performed by the orchestration engine; and (ii) generate, at compile time, metadata code artifacts from the configuration file, where the metadata code artifacts capture the sequence of activities to be performed by the orchestration engine, and where the orchestration engine uses the metadata code artifacts at runtime to manage the calls to the back-end systems. The method comprises: (i) receiving, by the computer-based artifact translation system, a configuration file that specifies the sequence of activities to be performed by the orchestration engine; (ii) generating, at compile time, by the computer-based artifact translation system, the metadata code artifacts from the configuration file; and (iii) using, at run time, by the orchestration engine of the middle tier, the metadata code artifacts to orchestrate calls to one or more back-end systems of the order management system for implementing trade orders for financial products.

In various implementations, the metadata code artifacts are written in JSON or XML. Also, the configuration file may comprise an activity table in a spreadsheet that specifies the sequence of activities to be performed by the orchestration engine. The activity table may list a plurality of activities to be performed by the orchestration engine, and each of the plurality of activities may be assigned a step sequence identifier that identifies when the activity is to be performed in the sequence, such that multiple activities listed in the activity data are permitted to have a common step sequence identifier. Further, the metadata code artifacts generated by the artifact translation system may specify the sequence of activities to be performed by the orchestration engine, such that the activities with the common step sequence identifier are to be performed synchronously by the orchestration engine.

In various implementations, at least a second activity listed in the activity table may specify a dependency to a first activity listed in the activity table, wherein the first rule has a lower step sequence identifier, in which case the metadata code artifacts generated by the artifact translation system may specify that the orchestration engine is to perform the second activity only if the first activity was completed successfully. Still further, at least a third activity listed in the activity table may specify a precondition, in which case the metadata code artifacts generated by the artifact translation system may specify that the orchestration engine is to perform the third activity only if the precondition for the first activity evaluates to true.

In various implementations, the calls to the back-end systems may comprise calls to a rules engine and calls to a data system in order to orchestrate the financial product trades.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
a middle tier that comprises one or more servers, wherein the one or more servers of the middle tier execute an orchestration engine that orchestrates calls to one or more back-end systems; and
an artifact translation hardware system that is configured, through programming, to:
receive a configuration file that specifies a sequence of activities to be performed by the orchestration engine; and
generate, at compile time, metadata code artifacts from the configuration file, wherein the metadata code artifacts capture the sequence of activities to be performed by the orchestration engine, and wherein the orchestration engine manages the calls to the back-end systems based on the metadata code artifacts at runtime.

2. The computer system of claim 1, wherein the configuration file comprises an activity table that specifies the sequence of activities to be performed by the orchestration engine.

3. The computer system of claim 2, wherein the configuration file comprises a spreadsheet.

4. The computer system of claim 2, wherein:
the activity table:
lists a plurality of activities to be performed by the orchestration engine; and
each of the plurality of activities is assigned a step sequence identifier that identifies when the activity is to be performed in the sequence, such that multiple activities listed in the activity table are permitted to have a common step sequence identifier; and
the metadata code artifacts generated by the artifact translation system specifies the sequence of activities to be performed by the orchestration engine, such that the activities with the common step sequence identifier are to be performed synchronously by the orchestration engine.

5. The computer system of claim 4, wherein:
at least a second activity listed in the activity table specifies a dependency to a first activity listed in the activity table, wherein the first activity has a lower step sequence identifier than the second activity; and
the metadata code artifacts generated by the artifact translation system specifies that the orchestration engine is to perform the second activity only if the first activity was completed successfully.

6. The computer system of claim 5, wherein:
at least a third activity listed in the activity table specifies a precondition; and
the metadata code artifacts generated by the artifact translation system specifies that the orchestration engine is to perform the third activity only if the precondition for the third activity evaluates to true.

7. The computer system of claim 4, wherein:
at least a first activity listed in the activity table specifies a precondition; and
the metadata code artifacts generated by the artifact translation system specifies that the orchestration engine is to perform the first activity only if the precondition for the first activity evaluates to true.

8. The computer system of claim 1, wherein:
the computer system comprises an order management system; and
the orchestration engine orchestrates calls to one or more back-end systems for implementing trade orders.

9. The computer system of claim 1, wherein:
the configuration file comprises an activity table that specifies the sequence of activities to be performed by the orchestration engine;
the activity table:
lists a plurality of activities to be performed by the orchestration engine; and
each of the plurality of activities is assigned a step sequence identifier that identifies when the activity is to be performed in the sequence; and
the metadata code artifacts generated by the artifact translation system specifies the sequence of activities to be performed by the orchestration engine.

10. The computer system of claim 9, wherein:
a second activity listed in the activity table specifies a dependency to a first activity listed in the activity table, wherein the first activity has a lower step sequence identifier than the second activity; and
the metadata code artifacts generated by the artifact translation system specifies that the orchestration engine is to perform the second activity only if the first activity was completed successfully.

11. The computer system of claim 9, wherein:
a first activity listed in the activity table specifies a precondition; and
the metadata code artifacts generated by the artifact translation system specifies that the orchestration engine is to perform the first activity only if the precondition for the first activity evaluates to true.

12. A method of configuring a computer system, wherein the computer system comprises a middle tier that comprises one or more servers, wherein the one or more servers of the middle tier execute an orchestration engine, wherein the orchestration engine orchestrates calls to one or more back-end systems, the method comprising:

receiving, by a computer-based artifact translation system, a configuration file that specifies a sequence of activities to be performed by the orchestration engine;

generating, at compile time, by the computer-based artifact translation system, metadata code artifacts from the configuration file, wherein the metadata code artifacts capture the sequence of activities to be performed by the orchestration engine, and wherein the orchestration engine uses the metadata code artifacts at runtime to manage the calls to the one or more back-end systems; and at run time, by the orchestration engine of the middle tier, based on the metadata code artifacts orchestrating calls to the one or more back-end systems of the order management system.

13. The method of claim 12, wherein the configuration file comprises an activity table that specifies the sequence of activities to be performed by the orchestration engine.

14. The method of claim 13, wherein:

the activity table:
lists a plurality of activities to be performed by the orchestration engine; and
each of the plurality of activities is assigned a step sequence identifier that identifies when the activity is to be performed in the sequence, such that multiple activities listed in the activity table are permitted to have a common step sequence identifier; and the metadata code artifacts generated by the artifact translation system specifies the sequence of activities to be performed by the orchestration engine, such that the activities with the common step sequence identifier are to be performed synchronously by the orchestration engine.

15. The method of claim 14, wherein:

at least a second activity listed in the activity table specifies a dependency to a first activity listed in the activity table, wherein the first activity has a lower step sequence identifier than the second activity; and the metadata code artifacts generated by the artifact translation system specifies that the orchestration engine is to perform the second activity only if the first activity was completed successfully.

16. The method of claim 15, wherein:

at least a third activity listed in the activity table specifies a precondition; and the metadata code artifacts generated by the artifact translation system specifies that the orchestration engine is to perform the third activity only if the precondition for the third activity evaluates to true.

17. The method of claim 14, wherein:

at least a first activity listed in the activity table specifies a precondition; and the metadata code artifacts generated by the artifact translation system specifies that the orchestration engine is to perform the first activity only if the precondition for the first activity evaluates to true.

18. The method of claim 12, wherein:

the configuration file comprises an activity table that specifies the sequence of activities to be performed by the orchestration engine;

the activity table:
lists a plurality of activities to be performed by the orchestration engine; and
each of the plurality of activities is assigned a step sequence identifier that identifies when the activity is to be performed in the sequence; and the metadata code artifacts generated by the artifact translation system specifies the sequence of activities to be performed by the orchestration engine.

19. The method of claim 18, wherein:

a second activity listed in the activity table specifies a dependency to a first activity listed in the activity table, wherein the first activity has a lower step sequence identifier than the second activity; and the metadata code artifacts generated by the artifact translation system specifies that the orchestration engine is to perform the second activity only if the first activity was completed successfully.

20. The method of claim 18, wherein:

a first activity listed in the activity table specifies a precondition; and the metadata code artifacts generated by the artifact translation system specifies that the orchestration engine is to perform the first activity only if the precondition for the first activity evaluates to true.

\* \* \* \* \*